(12) United States Patent
Wu et al.

(10) Patent No.: US 12,014,752 B2
(45) Date of Patent: Jun. 18, 2024

(54) FULLY AUTOMATED POST-PRODUCTION EDITING FOR MOVIES, TV SHOWS AND MULTIMEDIA CONTENTS

(71) Applicant: WeMovie Technologies, San Ramon, CA (US)

(72) Inventors: Xidong Wu, San Ramon, CA (US); Xiubo Wu, Beijing (CN)

(73) Assignee: WeMovie Technologies, San Ramon, CA (US)

( * ) Notice: Subject to any disclaimer, the term of this patent is extended or adjusted under 35 U.S.C. 154(b) by 0 days.

(21) Appl. No.: 17/728,577

(22) Filed: Apr. 25, 2022

(65) Prior Publication Data

US 2022/0254378 A1 Aug. 11, 2022

Related U.S. Application Data

(63) Continuation of application No. 17/207,477, filed on Mar. 19, 2021, now Pat. No. 11,315,602, which is a
(Continued)

(51) Int. Cl.
*G11B 27/034* (2006.01)
*G06V 20/40* (2022.01)
(Continued)

(52) U.S. Cl.
CPC ............ *G11B 27/034* (2013.01); *G06V 20/46* (2022.01); *G11B 27/34* (2013.01);
(Continued)

(58) Field of Classification Search
CPC ............... G11B 27/034; G11B 27/34; H04N 21/43072; H04N 21/8113; H04N 21/8146; G06K 9/00744
See application file for complete search history.

(56) References Cited

U.S. PATENT DOCUMENTS 6,466,655 B1 10/2002 Clark
8,244,104 B2 8/2012 Kashiwa
(Continued)

FOREIGN PATENT DOCUMENTS

CA 3038767 10/2019
CN 101316362 A 12/2008
(Continued)

OTHER PUBLICATIONS

International Search Report and Written Opinion dated Apr. 21, 2023 for International Application No. PCT/US2022/081244 (23 pages).
(Continued)

*Primary Examiner* — Girumsew Wendmagegn
(74) *Attorney, Agent, or Firm* — Perkins Coie LLP (57) ABSTRACT

Methods, apparatus and systems related to post-production stage of a multimedia content are described. In one example aspect, a method for performing automated post-production editing includes receiving one or more machine-readable scripts corresponding to one or more scenes of a storyline. The one or more machine-readable scripts include information about multimodal data and editing instructions for each of the one or more scenes. The method also includes identifying, based on the multimodal data for each of the one or more scenes, at least one change in an audio or video feature in the multiple streams of multimedia content corresponding to the one or more scenes, editing the multiple streams of multimedia content based on the editing instructions and selectively based on the identified change, and generating a final stream of multimedia content based on the edited multiple streams.

20 Claims, 6 Drawing Sheets

Related U.S. Application Data continuation of application No. PCT/US2020/032217, filed on May 8, 2020.

(51) Int. Cl.
   *G11B 27/34* (2006.01)
   *H04N 21/43* (2011.01)
   *H04N 21/81* (2011.01)

(52) U.S. Cl.
   CPC ... *H04N 21/43072* (2020.08); *H04N 21/8113* (2013.01); *H04N 21/8146* (2013.01)

(56) References Cited

U.S. PATENT DOCUMENTS

| | | | |
|---|---|---|---|
| 8,560,951 | B1 | 10/2013 | Snyder |
| 8,910,201 | B1 | 12/2014 | Zamiska et al. |
| 9,106,812 | B1 | 8/2015 | Price et al. |
| 9,998,722 | B2 | 6/2018 | Swearingen et al. |
| 10,057,537 | B1 | 8/2018 | Macdonald-King et al. |
| 10,721,377 | B1 | 7/2020 | Wu et al. |
| 11,070,888 | B1 | 7/2021 | Wu et al. |
| 11,107,503 | B2 | 8/2021 | Wu et al. |
| 11,166,086 | B1 | 11/2021 | Wu et al. |
| 11,315,602 | B2 * | 4/2022 | Wu ............... G11B 27/034 |
| 11,321,639 | B1 | 5/2022 | Wu et al. |
| 11,330,154 | B1 | 5/2022 | Wu et al. |
| 11,564,014 | B2 | 1/2023 | Wu et al. |
| 11,570,525 | B2 | 1/2023 | Wu et al. |
| 2002/0099577 | A1 | 7/2002 | Black |
| 2003/0061610 | A1 | 3/2003 | Errico |
| 2003/0225641 | A1 | 12/2003 | Gritzmacher et al. |
| 2006/0053041 | A1 | 3/2006 | Sakai |
| 2006/0251382 | A1 | 11/2006 | Vronay et al. |
| 2006/0251383 | A1 | 11/2006 | Vronay et al. |
| 2006/0282783 | A1 | 12/2006 | Covell et al. |
| 2006/0282785 | A1 | 12/2006 | McCarthy et al. |
| 2007/0099684 | A1 | 5/2007 | Butterworth |
| 2008/0010601 | A1 | 1/2008 | Dachs |
| 2008/0028318 | A1 | 1/2008 | Shikuma |
| 2008/0033801 | A1 | 2/2008 | McKenna et al. |
| 2008/0036917 | A1 | 2/2008 | Pascarella et al. |
| 2008/0101476 | A1 | 5/2008 | Tian et al. |
| 2009/0063659 | A1 | 3/2009 | Kazerouni et al. |
| 2009/0279840 | A1 | 11/2009 | Kudo et al. |
| 2010/0183280 | A1 | 7/2010 | Beauregard et al. |
| 2011/0085025 | A1 | 4/2011 | Pace et al. |
| 2011/0162002 | A1 | 6/2011 | Jones et al. |
| 2011/0206351 | A1 | 8/2011 | Givoly |
| 2011/0249953 | A1 | 10/2011 | Suri et al. |
| 2012/0294589 | A1 | 11/2012 | Samra et al. |
| 2013/0067333 | A1 | 3/2013 | Brenneman |
| 2013/0124984 | A1 | 5/2013 | Kuspa |
| 2013/0151970 | A1 | 6/2013 | Achour |
| 2013/0166625 | A1 | 6/2013 | Swaminathan et al. |
| 2013/0167168 | A1 | 6/2013 | Ellis et al. |
| 2013/0177294 | A1 | 7/2013 | Kennberg |
| 2013/0204664 | A1 | 8/2013 | Romagnolo et al. |
| 2013/0232178 | A1 | 9/2013 | Katsambas |
| 2013/0290557 | A1 | 10/2013 | Baratz |
| 2014/0082079 | A1 | 3/2014 | Dunsmuir |
| 2014/0119428 | A1 | 5/2014 | Catchpole et al. |
| 2014/0132841 | A1 | 5/2014 | Beaulieu-Jones et al. |
| 2014/0133834 | A1 | 5/2014 | Shannon |
| 2014/0242560 | A1 | 8/2014 | Movellan et al. |
| 2014/0328570 | A1 | 11/2014 | Cheng et al. |
| 2015/0012325 | A1 | 1/2015 | Maher |
| 2015/0043892 | A1 | 2/2015 | Groman |
| 2015/0082349 | A1 | 3/2015 | Ishtiaq et al. |
| 2015/0256858 | A1 | 9/2015 | Xue |
| 2015/0261403 | A1 | 9/2015 | Greenberg et al. |
| 2015/0281710 | A1 | 10/2015 | Sievert et al. |
| 2015/0302893 | A1 | 10/2015 | Shannon |
| 2015/0363718 | A1 | 12/2015 | Boss et al. |
| 2015/0379358 | A1 | 12/2015 | Renkis |
| 2016/0027198 | A1 | 1/2016 | Terry et al. |
| 2016/0050465 | A1 | 2/2016 | Zaheer et al. |
| 2016/0071544 | A1 | 3/2016 | Waterston et al. |
| 2016/0132546 | A1 | 5/2016 | Keating |
| 2016/0292509 | A1 | 10/2016 | Kaps et al. |
| 2016/0323483 | A1 | 11/2016 | Brown |
| 2016/0350609 | A1 * | 12/2016 | Mason ............... G06T 15/20 |
| 2016/0360298 | A1 | 12/2016 | Chalmers et al. |
| 2017/0017644 | A1 | 1/2017 | Accardo et al. |
| 2017/0048492 | A1 | 2/2017 | Buford et al. |
| 2017/0169853 | A1 | 6/2017 | Hu et al. |
| 2017/0178346 | A1 | 6/2017 | Ferro et al. |
| 2017/0337912 | A1 | 11/2017 | Caligor et al. |
| 2017/0358023 | A1 | 12/2017 | Peterson |
| 2018/0005037 | A1 | 1/2018 | Smith et al. |
| 2018/0213289 | A1 | 7/2018 | Lee et al. |
| 2019/0045194 | A1 | 2/2019 | Zavesky et al. |
| 2019/0058845 | A1 | 2/2019 | MacDonald-King et al. |
| 2019/0075148 | A1 | 3/2019 | Nielsen et al. |
| 2019/0107927 | A1 | 4/2019 | Schriber et al. |
| 2019/0155829 | A1 | 5/2019 | Schriber et al. |
| 2019/0215421 | A1 | 7/2019 | Parthasarathi et al. |
| 2019/0215540 | A1 | 7/2019 | Nicol et al. |
| 2019/0230387 | A1 | 7/2019 | Gersten |
| 2019/0244639 | A1 | 8/2019 | Benedetto |
| 2019/0354763 | A1 | 11/2019 | Stojancic et al. |
| 2019/0356948 | A1 | 11/2019 | Stojancic et al. |
| 2020/0065612 | A1 | 2/2020 | Xu et al. |
| 2020/0081596 | A1 | 3/2020 | Greenberg et al. |
| 2020/0168186 | A1 | 5/2020 | Yamamoto |
| 2020/0213644 | A1 | 7/2020 | Gupta et al. |
| 2020/0312368 | A1 | 10/2020 | Waterman |
| 2020/0327190 | A1 | 10/2020 | Agrawal et al. |
| 2020/0364668 | A1 | 11/2020 | Altunkaynak |
| 2020/0396357 | A1 | 12/2020 | Wu et al. |
| 2021/0011960 | A1 | 1/2021 | Chambon-Cartier |
| 2021/0084085 | A1 | 3/2021 | Jones et al. |
| 2021/0104260 | A1 | 4/2021 | Wu et al. |
| 2021/0152619 | A1 | 5/2021 | Bercovich |
| 2021/0185222 | A1 | 6/2021 | Zavesky et al. |
| 2021/0211779 | A1 | 7/2021 | Wu et al. |
| 2021/0264161 | A1 | 8/2021 | Saraee et al. |
| 2021/0350829 | A1 | 11/2021 | Wu et al. |
| 2021/0398565 | A1 | 12/2021 | Wu et al. |
| 2022/0070540 | A1 | 3/2022 | Wu et al. |
| 2022/0132223 | A1 | 4/2022 | Wu et al. |
| 2023/0041641 | A1 | 2/2023 | Wu et al. |

FOREIGN PATENT DOCUMENTS

| | | |
|---|---|---|
| CN | 101365094 | 2/2009 |
| CN | 101960440 | 1/2011 |
| CN | 101981589 A | 2/2011 |
| CN | 104581222 | 4/2015 |
| CN | 107615766 A | 1/2018 |
| CN | 108447129 A | 8/2018 |
| CN | 109196371 | 1/2019 |
| CN | 109783659 A | 5/2019 |
| CN | 109905732 | 6/2019 |
| CN | 111447505 A | 7/2020 |
| JP | 2000101647 A | 4/2000 |
| WO | 2004105035 A1 | 12/2004 |
| WO | 2008156558 A1 | 12/2008 |
| WO | 2010068175 A2 | 6/2010 |
| WO | 2011004381 A1 | 1/2011 |
| WO | 2014090730 A1 | 6/2014 |
| WO | 2021074721 A2 | 4/2021 |

OTHER PUBLICATIONS

International Search Report and Written Opinion dated Mar. 10, 2020 in International Application No. PCT/CN2019/090722, 10 pages.

Davenport, Glorianna, et al., "Cinematic primitives for multimedia", MIT Media Laboratory, IEEE Computer graphics and Applications, pp. 67-74, Jul. 1991.

(56) References Cited

OTHER PUBLICATIONS

International Search Report and Written Opinion dated May 7, 2020 for International Application No. PCT/CN2019/099534, filed on Aug. 7, 2019 (9 pages).

International Search Report and Written Opinion dated May 27, 2020 for International Application No. PCT/CN2019/109919, filed on Oct. 8, 2019 (11 pages).

International Search Report and Written Opinion dated Aug. 7, 2020 for International Application No. PCT/US2020/032217, filed on May 8, 2020 (10 pages).

International Search Report and Written Opinion dated Jan. 3, 2022 for International Application No. PCT/US2021/047407, filed on Aug. 24, 2021 (20 pages).

P. Minardi and B. Alonso, "How Automation Can Help Broadcasters and Production Companies Reach Video Production Nirvana," SMPTE17: Embracing Connective Media, 2015, pp. 1-12, doi: 10.5594/M001738. (Year: 2015).

International Search Report and Written Opinion dated Feb. 28, 2022 for International Application No. PCT/US2021/056839, filed on Oct. 27, 2021 (16 pages).

Hua et al., "AVE—Automated Home Video Editing," Proceedings of the 11th ACM International Conference on Multimedia, MM '03, Berkeley, CA, Nov. 2-8, 2003.

Tunikova, Oksana, Jan. 27, 2019, "Product Placement—A Good Advertising Adaptation?," Business 2 Community, available at https://www.business2community.com/marketing/product-placement-good-advertising-adaptation-02026643.

Extended European Search Report for European Patent Application No. 199 32502.6, dated Nov. 25, 2022 (8 pages).

Office Action for Chinese Patent Application No. 20198009 8650.5, dated Nov. 10, 2022 (15 pages).

Notice of Allowance for Chinese Patent Application No. 202180087538.9, mailed Mar. 8, 2024 (8 pages).

\* cited by examiner

FULLY AUTOMATED POST-PRODUCTION EDITING FOR MOVIES, TV SHOWS AND MULTIMEDIA CONTENTS

PRIORITY CLAIM AND RELATED APPLICATION

This application is a continuation of and claims priority to and benefits of U.S. patent application Ser. No. 17/207,477, filed Mar. 19, 2021, which is a continuation of International Patent Application No. PCT/US2020/032217 of the same title and the same content, filed on May 8, 2020. The entire content of the before-mentioned patent applications is incorporated by reference as part of the disclosure of this application.

TECHNICAL FIELD

This patent document relates to post-production editing of motion pictures, videos, movies or multimedia products including moving images and associated online distribution or streaming services.

BACKGROUND

Making a movie or TV show is a labor-intensive and financially costly process. The production process of a movie may take more than a year and require collaboration from a large and diverse crew. Post-production editing can take even longer than the actual shooting of the content because it includes the complete editing, color correction, and/or the addition of music and sound. The process of editing a movie is often seen as the second directing, and the complex process drives up the production cost. The labor-intensive nature and the high costs of editing movie and/or TV programs are barriers to many contents to be offered to consumers in the era of the increasingly digitization of various processes and progresses in cloud technologies in the movie and TV production and distribution.

SUMMARY

Described herein are techniques, subsystems and systems for performing automated post-production editing to reduce and minimize the processing time and cost of generating digital multimedia content. The disclosed techniques can be implemented as a fully automated multimedia editing platform to enable the possibility of real-time content production and distribution. In particular, part of the multimedia content can be edited automatically according to a storyline that is represented as a machine-readable script while a remaining part of the content is still being produced using an automated production system. The disclosed techniques can also be used in traditional production and post-production settings to reduce cost and time required for manual post-production editing.

In one example aspect, a system for performing post-production editing is disclosed. The system comprises one or more processors, and one or more memories including processor executable code. The processor executable code upon execution by the one or more processors configures the one or more processors to receive one or more machine-readable scripts corresponding to one or more scenes of a storyline. The one or more machine-readable scripts include information about multimodal data and editing instructions for each of the one or more scenes. The one or more processors are configured to identify based on the multimodal data for each of the one or more scenes, at least one change in an audio or video feature in multiple streams of multimedia content corresponding to the one or more scenes, edit the multiple streams of multimedia content based on the editing instructions and selectively based on the identified change, and generate a final stream of multimedia content based on the edited multiple streams.

In another example aspect, a system for producing a multimedia digital content is disclosed. The system comprises a production subsystem configured to receive one or more machine-readable scripts and determine actions for a set of production devices based on the one or more machine-readable scripts. The one or more machine-readable scripts include information about multimodal data and editing instructions for each of the one or more scenes for a production of footages according to a storyline. The system comprises a device management subsystem in communication with the production subsystem. The device management subsystem is configured to control the set of production devices based on the determined actions by the production system and provide real-time information about the production of the footages to the production subsystem. The production subsystem is further configured to update the one or more machine-readable scripts in real-time during the production according to the real-time information. The system also includes a post-production editing subsystem in communication with the production subsystem and the device management subsystem. The post-production editing system is configured to receive the one or more updated machine-readable scripts from the production subsystem, receive multiple streams of multimedia content from the device management subsystem, identify at least one change in an audio or video feature in the multiple streams of multimedia content based on the multimodal data for each of the one or more scenes, edit the multiple streams of multimedia content based on the editing instructions and selectively based on the identified change, and generate a final stream of multimedia content based on the edited multiple streams.

In yet another example aspect, a computer-implemented method for performing automated post-production editing is disclosed. The method comprises receiving one or more machine-readable scripts corresponding to one or more scenes of a storyline. The one or more machine-readable scripts include information about multimodal data and editing instructions for each of the one or more scenes. The method also includes receiving multiple streams of multimedia content corresponding to the one or more scenes, identifying at least one change in an audio or video feature in the multiple streams of multimedia content based on the multimodal data for each of the one or more scenes, editing the multiple streams of multimedia content based on the editing instructions and selectively based on the identified change, and generating a final stream of multimedia content based on the edited multiple streams.

The disclosed techniques can further facilitate post-production editing via digital analytics and digital intelligence, thereby allowing highly efficient production or creation of content. Users do not need to master sophisticated computing hardware or software knowledge. Non-professionals are thus able to produce movies without being deeply involved in the technical aspects of movie production and postproduction.

DETAILED DESCRIPTION

Movie and TV program production is a complex process involving many components and operations and tends to be labor intensive and costly. The examples of various production techniques and systems disclosed in this patent document can be used to leverage computing technologies and computer-based automation techniques via operations of computer processors, computer servers, computer storages and associated software tools that enable hardware and software modules to be networked in one or more communication networks or systems to provide cloud-based post-production editing services to multimedia content distributed across networks. In some aspects, implementations of disclosed post-production editing techniques and systems can provide cloud-based service features that allow fully automated editing of multimedia contents to vastly reduce time required for manual post-production editing. Such computer-based automation can be used to significantly reduce or eliminate traditional manual editing and computer-aided labor-intensive and costly editing by manual operation of one or more computer software tools by one or more persons. For example, in a fully automated post production process, the disclosed technology can be implemented to enable a computer system to begin fully computer enabled editing of a freshly captured segment of a video stream without a human operation of a software tool manually editing while a subsequent segment of the video stream is still being captured or recorded and additional segments of the video stream have yet been captured or recorded. In some aspects, implementations of disclosed post-production editing techniques and systems can provide real-time post-production capabilities to enable fully-automated production, post-production, and distribution of multimedia contents without using human manual operation of software tools. Various conventional and other digital editing processes and software editing tools may be used to perform post-production editing of video segments of different scenes in a movie or TV show by manually operating software tools to edit one video segment for one scene in a move or show after completion of shooting of that video segment of the scene. However, those digital editing processes generally cannot edit a first portion of the video segment of a scene while the remaining portions of the video segment for the scene are being captured or recorded. The disclosed technology provides real-time or nearly real-time automated editing and other processes to apply new digital and computer intelligence based on techniques and processes to provide new ways of making, editing and distributing multimedia contents for versatile multimedia applications for movie, TV and other markets.

The following sections use the movie post-production as an example and many disclosed features are applicable to TV program production and production of other multimedia with digital moving images.

Figure 1:
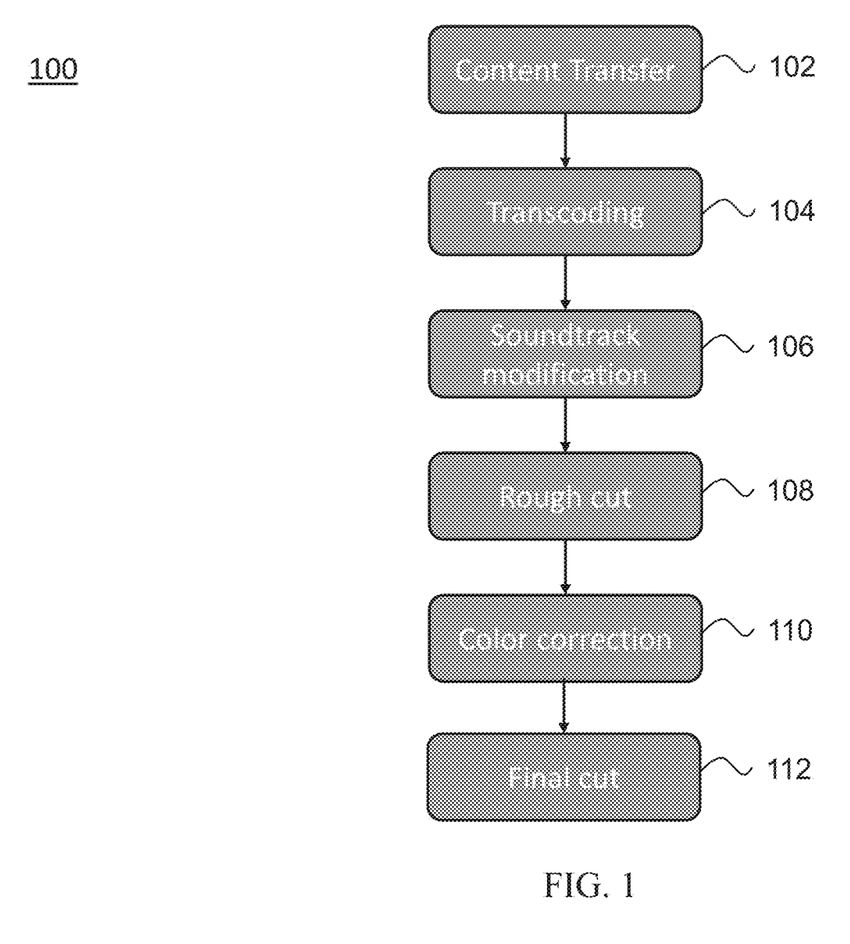
FIG. 1 is a flowchart representation of an example post-production process.

FIG. 1 is a flowchart representation of an example post-production process 100. The post-production process 100 starts with a content transfer stage 102, in which the raw media content is transferred from a production device (e.g., camera) to an external device. The raw content is then transcoded in the transcoding stage 104. In the transcoding stage 104, a portion of the transcoded footage (e.g., corresponding to a scene or a shot) is often assigned an identifier (e.g., a name) to facilitate identification of the footage later. Then, music and/or other soundtracks can be added to the transcoded footage in the soundtrack modification stage 106. The footage goes through one or more rounds of cutting and/or editing in the rough cut stage 108 based on input from editors/reviewers. The cut footage is then processed in the color correction stage 110 for some fine tuning. A final cut is produced in the final cut stage 112 to complete the post-production process.

Post-production editing has always been a labor-intensive process. With the advancement in computer vision and image/video processing technology, software programs and services have been developed to reduce the complexity of post-production editing by providing automated support. However, such automated support is often limited in various aspects. For example, such automated support may adopt various digital editing software tools to reduce the manual labor of the post-production editing. However, manual operation of editing software tools is still required in various post-production editing processes and one or more people are usually involved in operating the software tools and apply their personal judgment, decisions and preferences in selecting and editing the visual and audio information in the video segment. The disclosed technology deviates from such software-aided manual editing and provide a fully automated system to replace the above human-made decisions and selections in operating digital software tools with fully automated decisions and selections based on software and computer intelligence. For another example, some software-aided manual editing processes may be limited to processing a single input stream, while post-production editing typically involves multiple input streams. For example, a scene of a conversation between two people is shot with a main camera covering both people and two additional cameras each focusing on one person respectively. All three video streams need to be processed and edited to produce the desired effect based on the plot of the movie. Editing multiple streams remains largely a manual process and requires a great deal of human input. In this regard, the disclosed technology can provide an automated process to use software algorithms and computer intelligence to process and edit the multi video streams for a particular scene in the movie or TV show and eliminate human manual operation of software tools by applying individual personal judgment, decisions and preferences.

The disclosed technology can be further implemented to provide a new paradigm and novel features for online distribution of multimedia contents such as movies and TV shows by leveraging the automated production and editing processes offered by the disclosed technology. For example, making and sharing a video clip can be done at a relatively low cost and with ease via computer and communications networks. However, real-time production and distribution of multimedia content are impeded by the strenuous post-production editing process. There remains a need to develop techniques to enable fully automated post-production editing to facilitate fast content publishing. In this regard, the disclosed technology in this patent document can be implemented to provide efficient and automated online content publishing and distributing capabilities.

This patent document discloses techniques that can be implemented in various embodiments to achieve fully automated post-production editing. In some embodiments, data sources and editing operations can be included in structured machine-readable scripts to guide the post-production editing process. Details regarding the structured machine-readable scripts are described in International Patent Application No. PCT/CN2019/090722 entitled "PRODUCTION-AS-A-SERVICE SYSTEMS FOR MAKING MOVIES, TV SHOWS AND MULTIMEDIA CONTENTS" and filed on Jun. 11, 2019, the contents of which is incorporated by reference as part of the disclosure of this patent document. The structured machine-readable scripts can define inputs having different modalities (e.g., textual, audio, video, and/or pictures of object and cast) to help improve video editing. Multi-modality of the input information reduces search space size in video analysis and improves feature matching accuracy, thereby enabling efficient processing of multiple video streams. In some embodiments, additional editing operations can be determined based on detecting dramatic changes in the video streams. For example, changes in actions or emotions of the cast can indicate suitable cut positions to perform video cutting. Such analysis can further assist and improve the automated editing process.

Figure 2:
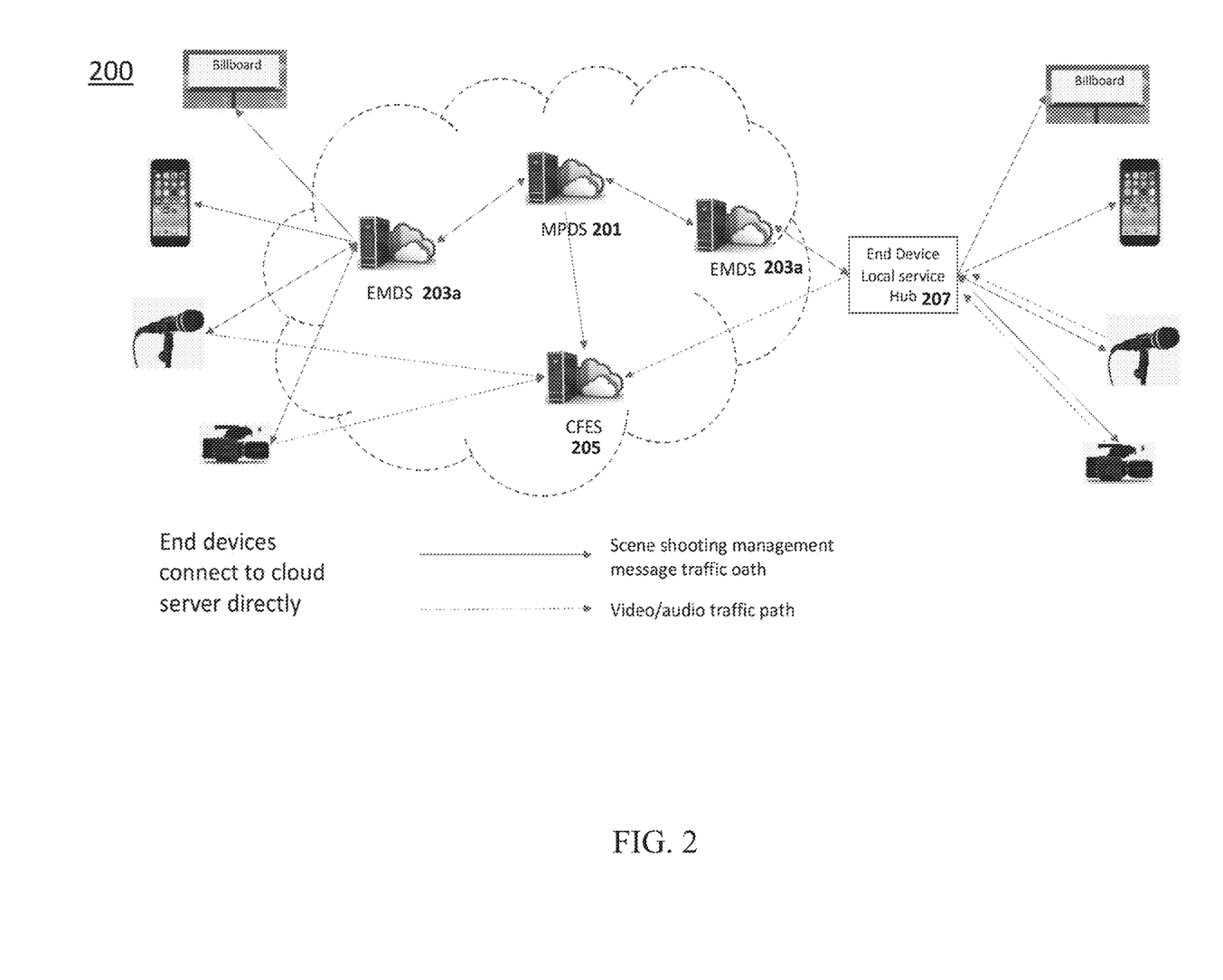
FIG. 2 illustrates an example architecture of a movie production system in accordance with one or more embodiments of the present technology.

FIG. 2 illustrates an example architecture of a movie production system 200 in accordance with one or more embodiments of the present technology. The movie production system example 200 includes at least three main sub-systems: a production system or subsystem 201 labeled as Movie Production Directing System (MPDS), a device management subsystem 203 labeled as End Devices Management System (EDMS), and a post-production editing system 205, which can be a Cloud-based Film Editing System (CFES). The production subsystem MPDS 201 serves as a role of the director in the automated production. The MPDS 201 is essential for coordinating a complex team effort to reduce or eliminate re-shooting, particularly for real-time production. The MPDS 201 is configured to receive one or more machine-readable scripts and determine actions for a set of production devices (described below in connection with EDMS 203) based on the one or more machine-readable scripts. The machine-readable scripts include information about data and editing instructions for each of the one or more scenes for a production of footages according to a storyline.

The device management subsystem EDMS 203 is a proxy server which receives instructions from MPDS 201 and relays the instructions to all end devices or production devices such as cameras, video recording devices, audio recording devices, lighting devices, etc. and personnel during the film shooting. The EDMS 203 is in communication with the production system MPDS 201 and configured to control the production devices based on the determined actions by the MPDS 201 and provide real-time information about the production of the footages to the MPDS 201. Since EDMS 203 controls end or production devices in real time, the proximity between the EDMS server(s) and the scene locations can reduce or eliminate unnecessary network delays to enable real-time performance. As illustrated in FIG. 2, two EMDS servers 203a, 203b are located in proximity to two different groups of production devices. The MPDS 201 is further configured to update the one or more machine-readable scripts in real-time during the production according to the real-time information provided by the EMDS servers.

The CFES 205 carries out most of post-production activities in an automated way. The CFES 205 is in communication with MPDS2 201 and is synchronized with production devices such as cameras and audio recording devices. It can either operate on all multimedia contents after the film shooting is completed or operate in real-time on multimedia contents streamed from production devices while content being captured at the scene. In some embodiments, the equipment transmits the multimedia contents to the CFES 205 via a local media transporting aggregation hub 207 that has transcoding capabilities. Transmission of transcoded footage from the local hub 207 to the CEFS 205 can be more efficient and robust. Details of the production system 200 are further described in the above referenced and incorporated patent document PCT/CN2019/090722.

In some implementations, the movie production system 200 may be offered as a full system to a user as a complete system for production of a movie or TV show (e.g., for real-time production and distribution); while in other implementations, one or more of the sub-systems in the system 200 may be accessed by a user to facilitate part of a particular production of a movie or a TV show. For example, the post-production editing system CFES 205 can be implemented as a stand-alone service to provide automated editing capabilities to existing videos. The CFES 205 can be deployed in one physical server or across multiple servers in a distributed manner. One or more machine learning based image processing algorithms can be implemented in CFES to perform audio and/or video analysis.

In some conventional systems and other digital systems, a Content-Based Image Retrieval (CBIR) system can be used to process an input of multi-media content and generates a semantic description of the multi-media content accordingly. However, to successfully determine the semantic meanings, various commercially available CBIR systems should be domain specific. Providing the same video input to different CBIR systems specified in different domains can result in different outputs. Furthermore, search space of a CBIR system is not limited, which can result in long processing time in many cases.

These attributes make various CBIR systems unsuitable for performing fully automated movie editing. In movie post-production, the input data can be in a variety of domains or genres (e.g., action, thrill, horror). The objective of post-production editing is to edit the multimedia content to improve certain visual and/or dramatic effects, whether it is to add music, a special effect, or to switch between different simultaneous video streams; the semantic meaning of the raw footage is already readily captured in the movie script. Therefore, instead of training a conventional CBIR system to recognize domain-specific semantic meanings of the input video, a structured script that defines various aspects of the production and post-production processes can be used to facilitate recognition of the cast and the objects in the input streams, thereby achieving efficient and automated editing of the contents.

The machine-readable structured script can further include the following information:
1. Audio/video recording device information, such as IP address (e.g., when the device is directly connected to internet) and/or a device ID (e.g., a Medium Access C ID in case the device is connected to a local hub and NAT). This information is needed to map the media stream to the device.

2. All cast and equipment information that is used in the production.
3. All editing related information such as indications of cut operations, music insertions, and/or special effect.
4. Embedded commercial information. Details about embedding commercial information in the structure script are described in International Patent Application No. PCT/CN2019/099534 entitled "ADAPTIVE MARKETING IN CLOUD-BASED CONTENT PRODUCTION" and filed on Aug. 7, 2019, the contents of which are incorporated by reference as part of the disclosure of this patent document.

Table 1 shows an example of structured movie script in accordance with the present technology.

TABLE 1

Example Structured Movie Script

```
<scene id=5>
<transition>fade in</transition>
<movietime>00:30:25</movietime>
<duration unit=minute>15</duration>
<location>
   <city>San Francisco</city>
   <latitude>120000</latitude>
   <longitude>120000</ longitude>
   <indoor_outdoor>outdoor<andoor_outdoor>
   <address>...</address>
</location>
<time>
   <shooting_date>04/05/2019</shooting_date>
   <day_night>day</day_night>
</time>
<staff>
   <director>John Doe</director>
   <photographers>
      ...
   </photographers>
   ...
</staff>
<casts>
   <actor>Forrest</actor>
   <actress>Jenny</actress>
   ...
</casts>
<commercials>
   <commercial id=1>
      <type>billboard</type>
      <shape>rectangle</shape>
      <pattern>black-white-grid</pattern>
      <commercial id=1>
   ...
</commercials>
<cameras>
   ...
</cameras>
<vehicles>
   ...
</vehicles>
<shot id=1>
   <camera id=1>
      <shot_type>close-up shot</shot_type>
      <direction>Forrest/right</direction>
      <angle>horizontal</angle>
   </camera>
   <camera id=2>
      <shot_type>close-up shot</shot_type>
      <direction>Jenny/left</direction>
      <angle>horizontal</angle>
   </camera>
   <camera id=3>
      <shot_type>media shot</shot_type>
      <direction>Forrest/Jenny/front</direction>
      <angle>horizontal</angle>
   </camera>
   <cut type='jump'>camera 3</cut>
   <action id=1 lapse=5s>Forrest and Jenny walking forward</action>
```

TABLE 1-continued

Example Structured Movie Script

```
   <cut type='jump'>camera 2</cut>
   <line speaker='Forrest'>Which college are you going</line>
   <music>
      <id>12</id>
      <type>romantic</type>
      <action>play</action>
   </music>
   <cut type='match'>camera 3</cut>
   <action id=2>Jenny turned to Forrest</action>
   <line speaker='Jenny'>I am going to DC to protest</line>
   <action id=3 lapse=40s>Forrest and Jenny walk in silence</action>
   <cut type='jump'>camera 1</cut>
   <music>
      <action>stop</action>
   </music>
</shot>
...
<shot id=2>
</shot>
   ...
<shot id=3>
</shot>
<transition>dissolve</transition>
</scene>
```

As shown in Table 1, given a machine-readable structured script, the CFES can readily obtain information regarding what objects and/or cast are shot during production. The script further describes the lines to be spoken by the cast, thereby allowing the post-production system to perform audio analysis using existing audio processing techniques (e.g., national language processing, NPL, algorithms). The search space for cast and/or objects, therefore, can greatly reduced to reduce the processing time.

Figure 3:
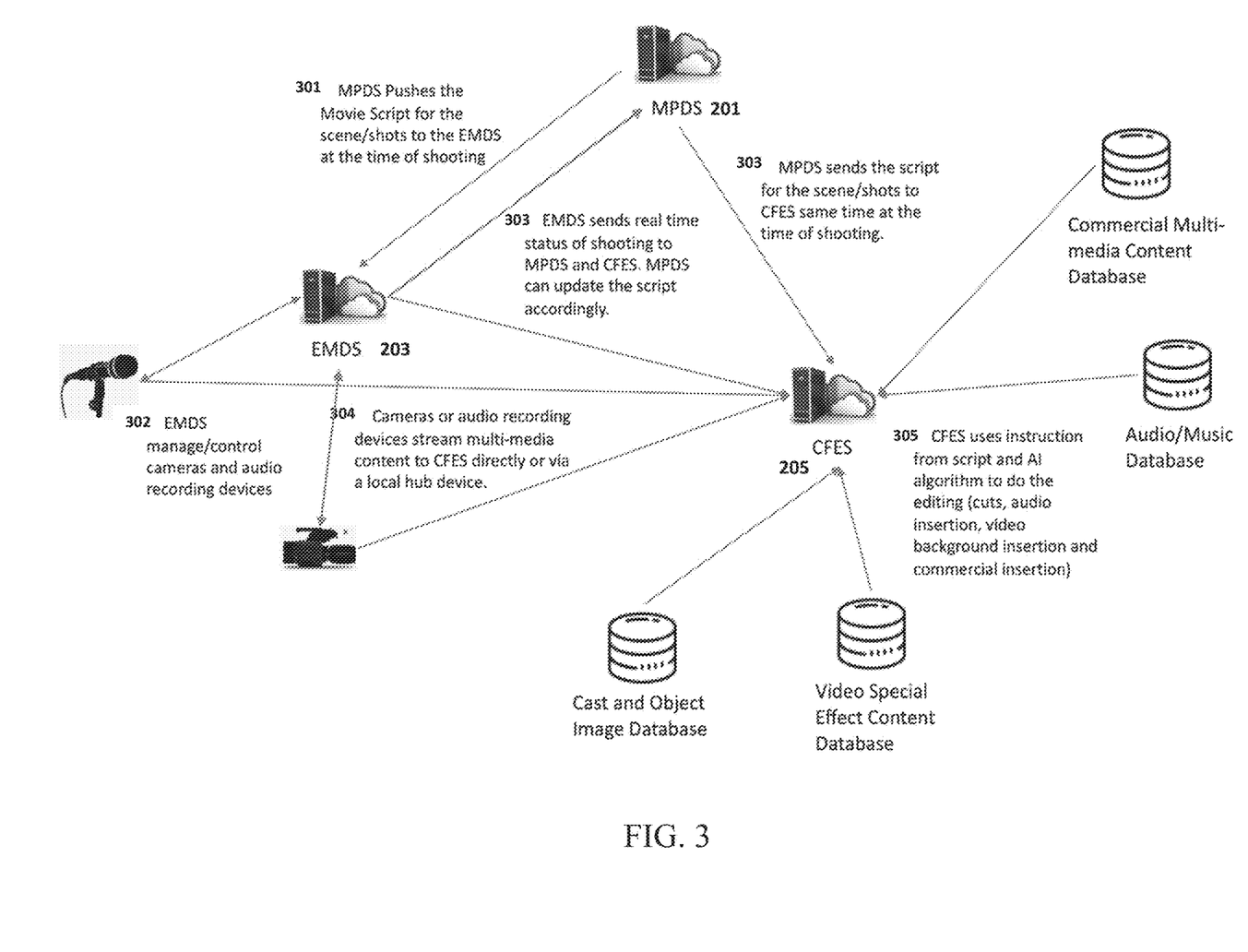
FIG. 3 illustrates example operations performed by components of a multimedia production and post-production system in accordance with the present technology.

FIG. 3 illustrates example operations performed by components of a multimedia production and post-production system 300 in accordance with the present technology.

Operation 301: During movie production, the MPDS 201 transmits the structured machine-readable movie script to each EDMS 203.

Operation 302: The EDMS 203 manages all equipment and personnel that are assigned to it according to the geographical location. For example, the staff and cast can be given communication devices (e.g., phones or mobile headsets) that allow efficient communication during the production time.

Operation 303: As the production goes on, the EMDS 203 sends real-time status of the production process to MPDS 201 and CFES 205. The MPDS 201 can modify the structured machine-readable script according to the actual production events. For example, the shot starting and end time can be updated according to the actual production time. In some embodiments, too allow real-time editing and distribution of the content, the MPDS 201 can transmit the modified portion of the script to the CFES 205 so that the CFES 205 can perform editing on a portion of the footage while the remaining part is still being produced.

Operation 304: Devices in the EMDS are configured to transfer content to the CFES directly or via the local hub 207. Part of the footage can be transferred while the remaining part is still being produced.

Operation 305: The CFES analyzes the received portion of the script to prepare the editing needs when the footage arrives. The CFES performs the editing based on information in the structured script as well as additional machine learning based techniques to determine dramatic changes in the footage.

To facilitate identification of cast and objects in the video, images of the faces and/or props can be preloaded into a database. Preloaded information provides more data points to perform feature matching. Preloaded information also helps define a much smaller search space, thereby increasing the efficiency of audio and/or visual analysis for multiple streams at the same time. For example, photos showing an actor's face from different angles can be preloaded into the database. As another example, photos showing different facial expressions of the actors/actresses can be preloaded. The CFES can leverage existing face detection algorithms to locate faces in the video streams and perform feature matching based on the preloaded data, thereby eliminating the need to training domain-specific models to identify the faces of the cast. The structured machine-readable script can define preloaded multi-modal data sources for the CFES. For example, audio sources (e.g., music) can be specified using corresponding audio tags (e.g., <music> tag). In some embodiments, image source can be located from the database based on cast names as defined in the structured machine-readable script.

The structured machine-readable script can also include editing instructions to facilitate automated editing. For example, editing operations (e.g., cut operation) can be preliminarily defined in pre-production stage according to the storyline of the movie. As shown in Table 1, the script can define cut operations using tags such as <cut>. The <cut> element can define when a cut should happen based on the location of the <cut> tag (e.g., between two lines, or in a middle of line). The <cut> element can further define how a cut should be performed (e.g., switching from current video stream to which another predefined video stream). The editing operations can be updated based on real-time production status (e.g., the actual starting/end time of a particular shot). The CFES then parses the editing operations and performs editing according to the operations specified in the script.

In some scenarios, the structured machine-readable script may not verbosely define all editing operations for post-production processing. For example, when the CFES is implemented as a stand-alone post-production editing service to process existing movies, the structured machine-readable script may not include all the details of the existing contents. In those cases, the CFES can perform post-production editing based on detected dramatic changes in emotions and/or actions. For example, after identifying faces of the cast in the video streams, the CFES can determine emotions of the cast based on matching the facial expressions to preloaded data. When the CFES detects a sudden change of emotions, such change can be marked as a candidate position for a cut operation. Similarly, CFES can detect a dramatic change of actions based on preloaded data and mark the change as a candidate for one or more editing operations.

For each shot of a scene, the final edited video clip can be identified by the scene ID and/or shot ID defined in the script. The clips can be stored in a storage medium (e.g., a multimedia container) in an ascending order according to the identifiers (e.g., scene ID and/or shot ID). In some embodiments, the clips are played based on the order when being distributed (e.g., across a network). In some embodiments, additional transition effects can be used to stitch the clips together. For example, the structured machine-readable script can define specific transition effects (e.g., fading in/out, morphing, etc.) to stitch adjacent ordered clips.

Figure 4:
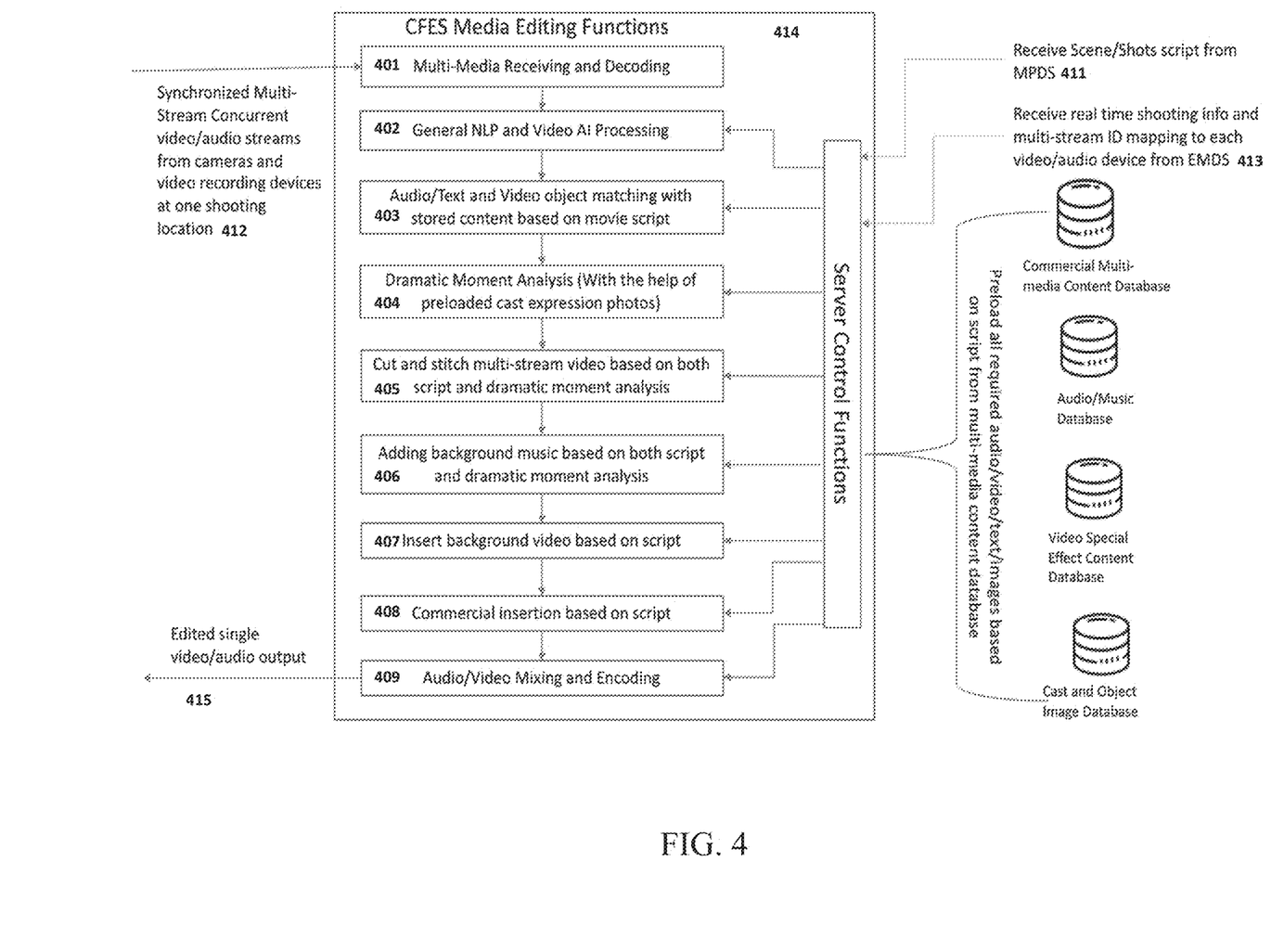
FIG. 4 illustrates example editing functions supported by a post-production system in accordance with the present technology.

FIG. 4 illustrates example editing functions supported by the CFES in accordance with the present technology. In some embodiments, different multimedia editing functions can be implemented in CFES at multiple levels in a vertical processing stack. Example functions include one or more of the following:

Function 401: The CFES can receive multiple synchronized media streams from cameras and/or video recording devices.

Function 402: The CFES performs audio processing (e.g., based on NLP processing techniques) and video processing (e.g., using computer vision or pattern recognition techniques to identify faces and/or objects). The CFES then extracts the lines and cast faces from a particular shot/scene.

Function 403: The CFES performs feature matching based on preloaded data (e.g., lines defined in the structured script, images of cast from different angles and/or showing different expressions).

Function 404: The CFES performs further video analysis to determine whether there are dramatic changes in the footage indicating "dramatic moments" that are not included in the script. The dramatic moments can be potential cut positioning to further cut/edit the footage.

Function 405: Based on information in the script and the determined dramatic moments, the CFES performs editing of multiple media streams. Furthermore, the script can include instructions for different transition types, such as fading in/out, wiping, morphing. Multiple scenes can be stitched together based on the transition types specified in the script.

Function 406: The CFES then adds background music as appropriate Based on information in the script and the determined dramatic moments.

Function 407: The CFES inserts background video to fill the blue/green screen based on the instructions in the script.

Function 408: The CFES perform editing to embed desired commercials based on the instructions in the script. Details about embedding commercial information in the structure script are described in PCT/CN2019/099534, filed on Aug. 7, 2019, the contents of which have been incorporated by reference as part of the disclosure of this patent document.

Function 409: The CFES combines the audio and video streams. The combined footage is then encoded to a desired format (e.g., MPEG-4 or H.264) for streaming and storing.

FIG. 4 further illustrates some of the control operations that can be performed by the CFES.

Operation 411: The CFES receives the structured script from the MPDS. Based on the instruction of the script, the CFES can start an editing instance on the server and load the relevant multi-modality data (e.g., music, pictures of cast and/or objects, embedded commercial content, special effect media content).

Operation 412: The CFES also synchronizes with production devices (e.g., cameras and/or video recording devices) to ensure that the multiple content streams from the EDMS are synchronized.

Operation 413: The CFES receives production information from the EMDS. The production information can be used to coordinate all editing functions.

Operation 414: The CFES performs one or more editing functions (e.g., Function 401 to Function 409) as described above to generate the final edited footage.

Operation 415: The CFES outputs the edited content as a single output stream to one or more distribution devices to enable distribution of the content.

Figure 5:
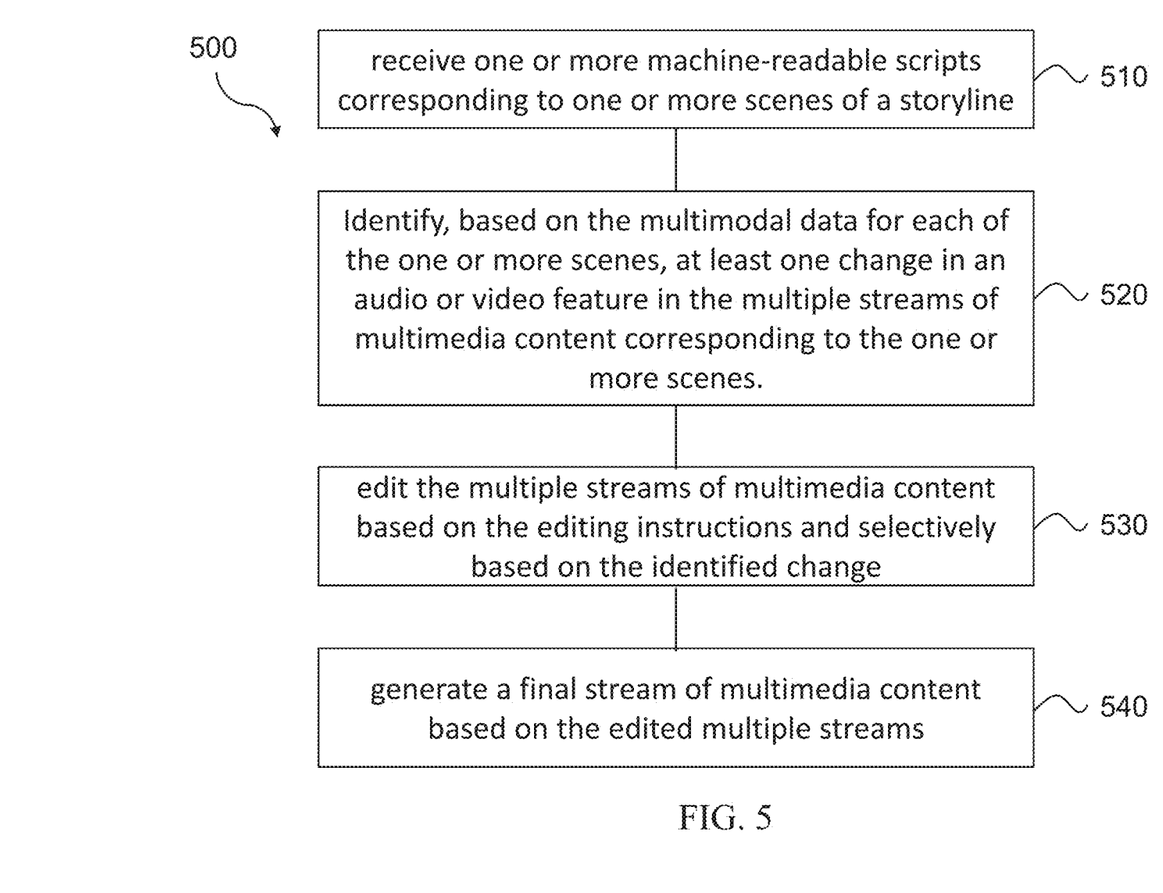
FIG. 5 is a flowchart representation of a method for automated post-production editing in accordance with the present technology.

FIG. 5 is a flowchart representation of a method 500 for automated post-production editing in accordance with the present technology. The method 500 includes, at operation 510, receiving one or more machine-readable scripts corresponding to one or more scenes of a storyline. The one or more machine-readable scripts include information about multimodal data and editing instructions for each of the one or more scenes. The method 500 includes, at operation 520, identifying, based on the multimodal data for each of the one or more scenes, at least one change in an audio or video feature in the multiple streams of multimedia content corresponding to the one or more scenes. The method 500 includes, at operation 530, editing the multiple streams of multimedia content based on the editing instructions and selectively based on the identified change. The method 500 also includes, at operation 540, generating a final stream of multimedia content based on the edited multiple streams.

In some embodiments, the multimodal data comprises at least one of: a soundtrack, an image, an embedded commercial content, or a special effect media content. In some embodiments, receiving the multiple streams of multimedia content comprises receiving the multiple streams of multimedia content from a set of production devices. In some embodiments, the method further includes synchronizing with the set of production devices. In some embodiments, receiving the multiple streams of multimedia content comprises retrieving the multiple streams of multimedia content from an external storage device.

In some embodiments, identifying the at least one change in the audio or video feature comprises detecting the audio or video feature in the multiple streams of multimedia content based on one or more machine learning techniques, comparing the detected audio or video feature with a set of predefined features indicated by the multimodal data in the one or more machine-readable scripts to determine the change. In some embodiments, the change of the audio or video feature comprises a change in an action or emotional of an actor or an actress.

Figure 6:
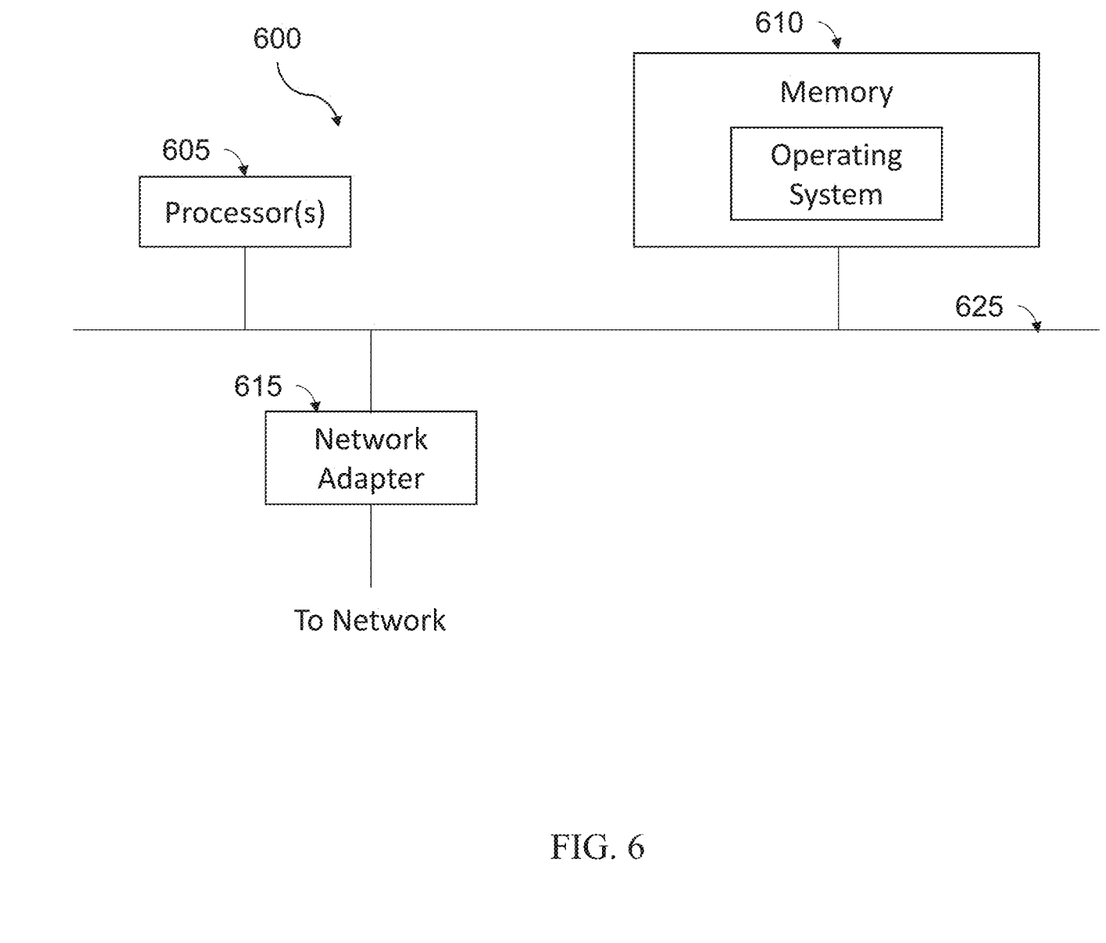
FIG. 6 a block diagram illustrating an example of the architecture for a computer system or other control device that can be utilized to implement various portions of the presently disclosed technology.

FIG. 6 is a block diagram illustrating an example of the architecture for a computer system or other control device 600 that can be utilized to implement various portions of the presently disclosed technology (e.g., the production planning module). The computer system 600 includes one or more processors 605 and memory 610 connected via an interconnect 625. The interconnect 625 may represent any one or more separate physical buses, point to point connections, or both, connected by appropriate bridges, adapters, or controllers. The interconnect 625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 605 may include central processing units (CPUs) to control the overall operation of, for example, the host computer. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 610 can be or include the main memory of the computer system. The memory 610 represents any suitable form of random access memory (RAM), read-only memory (ROM), flash memory, or the like, or a combination of such devices. In use, the memory 610 may contain, among other things, a set of machine instructions which, when executed by processor 605, causes the processor 605 to perform operations to implement embodiments of the presently disclosed technology.

Also connected to the processor(s) 605 through the interconnect 625 is a (optional) network adapter 615. The network adapter 615 provides the computer system 600 with the ability to communicate with remote devices, such as the storage clients, and/or other storage servers, and may be, for example, an Ethernet adapter or Fiber Channel adapter.

With the assistance from the cloud-based movie post-production systems and techniques as disclosed herein, movies, TV shows or videos can be edited and distributed at a much lower cost and at a much higher speed. Real-time streaming of different types of content, such as drama or movies, can become available. The repetitive and time-consuming manual editing process can be replaced by full automation and modifications specific to each storyline.

The above examples demonstrate that the techniques and systems disclosed in this patent document for post-production processing of movies, TV shows and other multimedia can be used to enhance the existing productions by movie and TV production companies, to reduce labor and costs, to provide flexibility and features that are not available in various convention movie or TV production and post-production processes. The disclosed techniques and systems can be used to simplify the post-production processes and thus enable amateur production of movies and videos, thereby incentivize a large group of artists to produce intriguing content. In addition, the disclosed techniques make real-time content production, editing, and distribution possible. With the capability of fully-automated post-production editing, content can be produced, edited, and distributed automatically based on machine-readable scripts generated according to desirable storylines. The techniques and systems disclosed in this patent document can be implemented to allow movie production technologies to be better utilized by both professional production companies and amateurs, and to provide accessibility to a vast amount of content to users in the mass market.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, machine-readable script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A post-production editing device for automatically editing a digital multimedia content, comprising at least one processor that is configured to:
   receive multiple streams of multimedia content data corresponding to one or more scenes based on a storyline for a digital multimedia content;
   receive one or more machine-readable scripts that comprise information about the one or more scenes based on the storyline, wherein the information comprises editing instructions for an individual scene of the one or more scenes, and wherein the one or more machine-readable scripts further comprise information indicating a location of preloaded reference information related to a set of predefined features;
   detect an audio or video feature in the multiple streams of the multimedia content data based on one or more machine learning techniques;
   identify a change of the audio or video feature by comparing the detected audio or video feature with the set of predefined features indicated in the one or more machine-readable scripts, wherein the comparing comprises feature matching between the audio or video feature with the preloaded reference information, wherein the preloaded reference information comprises at least an image of a facial expression of an actor or an actress or an audio sample; and
   selectively edit the multiple streams of the multimedia content data based on the identified change.

2. The post-production editing device of claim 1, wherein the change of the audio or video feature comprises at least one of: a change in an action performed by the actor or the actress, or a change in an emotion of the actor or the actress.

3. The post-production editing device of claim 1, wherein the at least one processor is configured to receive the multiple streams of the multimedia content data from an external storage device.

4. The post-production editing device of claim 1, wherein the multiple streams of the multimedia content data comprise at least an audio stream and a video stream of the digital multimedia content.

5. The post-production editing device of claim 1, wherein the preloaded reference information comprises multiple images of a face of the actor or the actress captured at different angles.

6. The post-production editing device of claim 1, wherein the preloaded reference information comprises an image of an equipment used during a production of the digital multimedia content.

7. A system for producing a multimedia digital content, comprising:
a production subsystem configured to:
receive one or more machine-readable scripts, wherein the one or more machine-readable scripts comprise information about one or more scenes in a storyline, wherein the information comprises editing instructions for an individual scene of the one or more scenes;
produce multiple streams of the multimedia digital content using a set of production devices based on the one or more machine-readable scripts; and
a post-production editing subsystem that is synchronized with the set of production devices in the production subsystem, wherein the post-production editing subsystem is configured to:
receive the multiple streams of the multimedia digital content and the one or more machine-readable scripts from the production subsystem,
detect an audio or video feature in the multiple streams of the multimedia digital content based on one or more machine learning techniques,
identify a change of the audio or video feature by comparing the detected audio or video feature with a set of predefined features indicated in the one or more machine-readable scripts, wherein the comparing comprises feature matching between the audio or video feature with preloaded reference information, wherein the preloaded reference information comprises at least an image of a facial expression of an actor or an actress or an audio sample; and
selectively edit the multiple streams of the multimedia digital content based on the identified change,
wherein the post-production editing subsystem is further configured to:
determine, based on the one or more machine-readable scripts, whether the identified change of the audio or video feature is a candidate for one or more editing operations for the multiple streams of the multimedia digital content.

8. The system of claim 7, wherein the multiple streams of the multimedia digital content comprise at least one of: a soundtrack, an image, an embedded commercial content, or a special effect media content.

9. The system of claim 7, wherein the information in the one or more machine-readable scripts further comprises actions for the set of production devices to take for producing the multiple streams, the system further comprising:
a device management subsystem in communication with the production subsystem and configured to:
control the set of production devices based on the actions in the one or more machine-readable scripts, and
provide real-time information about production of the multiple streams to enable the production subsystem to update the one or more machine-readable scripts in real-time during the production according to the real-time information.

10. The system of claim 7, wherein the change of the audio or video feature comprises at least one of: a change in an action performed by the actor or the actress, or a change in an emotion of the actor or the actress.

11. The system of claim 7, wherein the preloaded reference information comprises multiple images of a face of the actor or the actress captured at different angles.

12. The system of claim 7, wherein the preloaded reference information comprises an image of an equipment used during the producing of the digital multimedia content.

13. The system of claim 7, wherein the one or more machine-readable scripts comprise information indicating a location of the preloaded reference information.

14. A method for operating a post-production editing service, comprising:
receiving, by the post-production editing service, one or more machine-readable scripts that comprise information about one or more scenes in a storyline, wherein the information comprises editing instructions for an individual scene of the one or more scenes, and wherein the one or more machine-readable scripts further comprise information indicating a location of preloaded reference information related to a set of predefined features;
receiving, by the post-production editing service, multimedia content data corresponding to the one or more scenes in the storyline from one or more production devices;
detecting, by the post-production editing service, an audio or video feature in the multimedia content data based on one or more machine learning techniques;
identifying a change of the audio or video feature by comparing the detected audio or video feature with the set of predefined features indicated in the one or more machine-readable scripts, wherein the comparing comprises feature matching between the audio or video feature with the preloaded reference information that comprises at least an image of a facial expression of an actor or an actress or an audio sample; and
selectively editing the multimedia content data based on the identified change.

15. The method of claim 14, comprising synchronizing with the one or more production devices.

16. The method of claim 14, comprising:
receiving, by the post-production editing service, production information from the one or more production devices.

17. The method of claim 14, comprising:
generating a final stream of the multimedia content data based on the selective editing.

18. The method of claim 14, wherein the post-production editing service is deployed in a distributed manner across multiple sites that are interconnected by a communication network.

19. The method of claim 14, comprising:
embedding a commercial content into the multimedia content based on the one or more machine-readable scripts.

20. The method of claim 14, wherein the change of the audio or video feature comprises at least one of: a change in an action performed by the actor or the actress, or a change in an emotion of the actor or the actress.

* * * * *